United States Patent
Pham et al.

(10) Patent No.: US 6,378,810 B1
(45) Date of Patent: Apr. 30, 2002

(54) SATELLITE HAVING A SOLAR GENERATOR ON A DEPLOYABLE ARM, AND METHOD OF BRINGING SUCH A SATELLITE ON STATION

(75) Inventors: Philippe Pham, Pechabou; Bernard Polle, Saint-Orens, both of (FR)

(73) Assignee: Matra Marconi Space France, Paris (FR)

(*) Notice: Subject to any disclaimer, the term of this patent is extended or adjusted under 35 U.S.C. 154(b) by 0 days.

(21) Appl. No.: 09/503,323

(22) Filed: Feb. 14, 2000

(30) Foreign Application Priority Data

Feb. 16, 1999 (FR) .............................. 99 01847

(51) Int. Cl.⁷ .............................................. B64G 1/44
(52) U.S. Cl. ...................................... 244/173; 244/172
(58) Field of Search ........................................ 244/173

(56) References Cited

U.S. PATENT DOCUMENTS

| | | | |
|---|---|---|---|
| 4,630,791 A | * 12/1986 | Chapman ................... | 244/173 |
| 4,747,567 A | * 5/1988 | Johnson et al. ............. | 244/173 |
| 5,131,955 A | * 7/1992 | Stern et al. ................. | 244/173 |
| 5,441,221 A | 8/1995 | Wade et al. ................ | 244/159 |
| 5,816,540 A | * 10/1998 | Murphy et al. ............. | 244/173 |
| 5,833,175 A | * 11/1998 | Caplin ....................... | 244/173 |
| 6,036,143 A | * 3/2000 | Biber ........................ | 244/173 |

FOREIGN PATENT DOCUMENTS

| | | |
|---|---|---|
| EP | 0780304 | 6/1997 |
| EP | 0794121 | 9/1997 |
| GB | 2282114 | 3/1995 |
| WO | 92/21562 | 12/1992 |

OTHER PUBLICATIONS

Kelly W.D., Hill C.D.: "Solar panel tracking in Low Earth Orbit with Earth–oriented spacecraft"—Advances in the Astronautical Sciences, vol. 76, No. 1, Aug. 19–22, 1991, pp. 743–762, XP002115699—San Diego, CA, U.S.A., Abstract, Fig. 1A, col. 4, line 33–line 48.

Patent Abstracts of Japan—vol. 013, No. 567 (M–908), Dec. 15, 1989 & JP 01 237296 A (Mitsubishi Electric Corp.), Sep. 21, 1989, Abstract.

* cited by examiner

*Primary Examiner*—Michael J. Carone
*Assistant Examiner*—Gabriel S Sukman
(74) *Attorney, Agent, or Firm*—Larson & Taylor, PLC

(57) ABSTRACT

A satellite has a platform of elongated shape in a direction parallel to a roll axis of the satellite. A deployable arm is pivotally carried by a longitudinally extending face of the platform. A solar generator is carried at the end of the arm by a first motor for aiming the generator through a range of 360° about a pitch axis orthogonal to the direction of elongation of the platform. A second motor rotates the solar generator through a limited angular range about an axis that is orthogonal to the pitch axis and parallel to the plane of the generator. The arm, when deployed, moves the solar generator away from on a stored position in contact with the platform in a direction of a yaw axis.

12 Claims, 4 Drawing Sheets

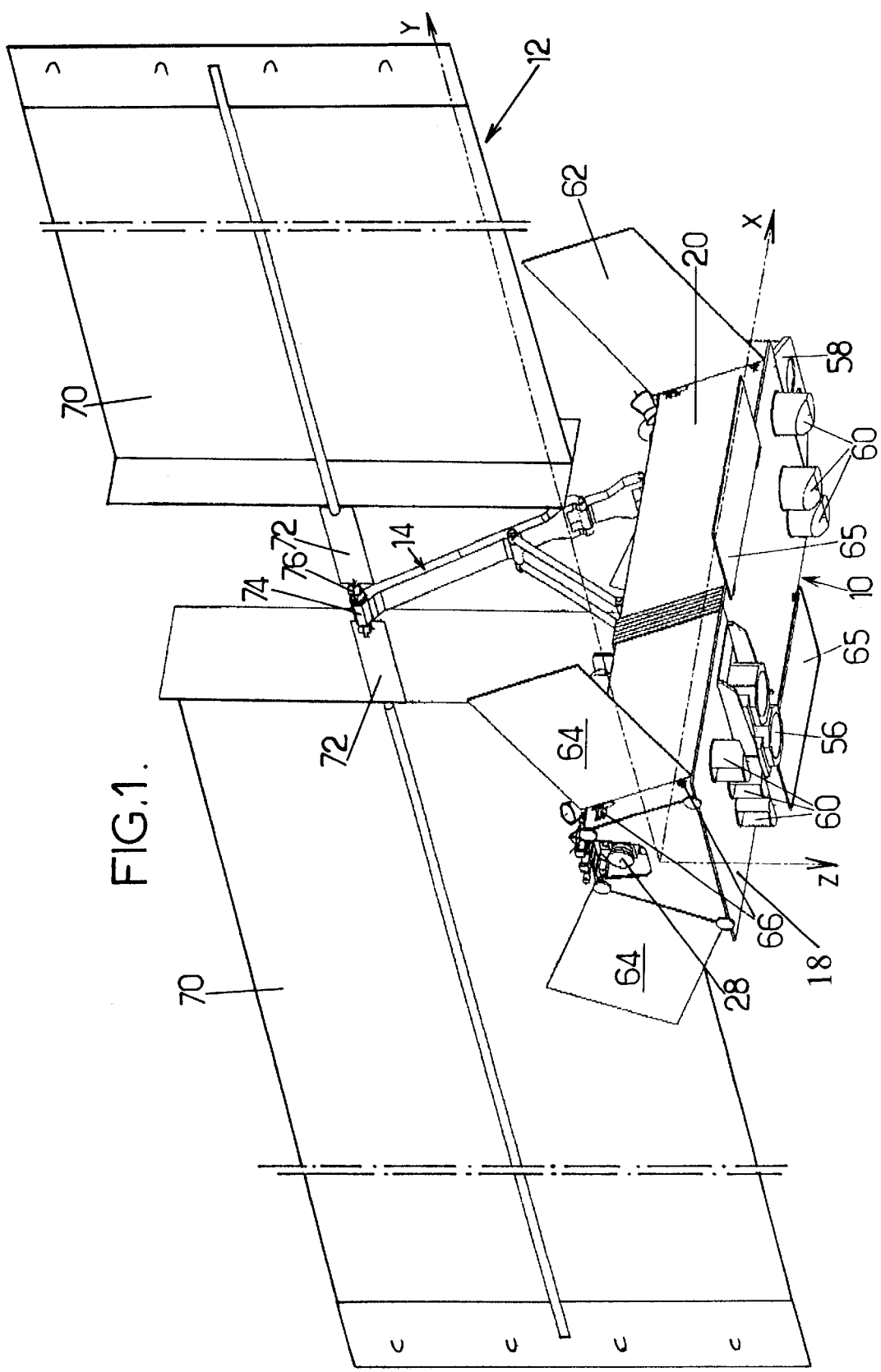

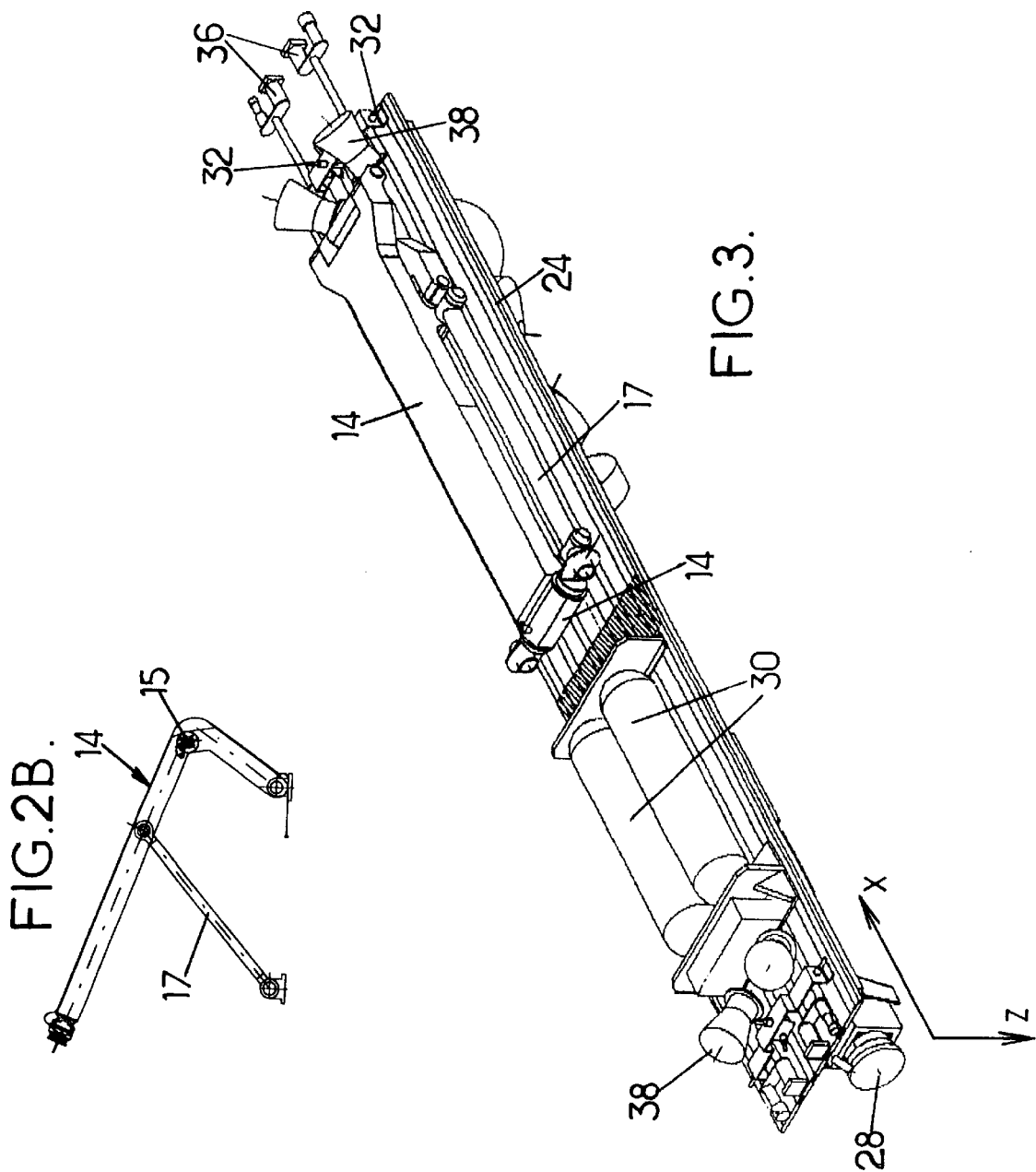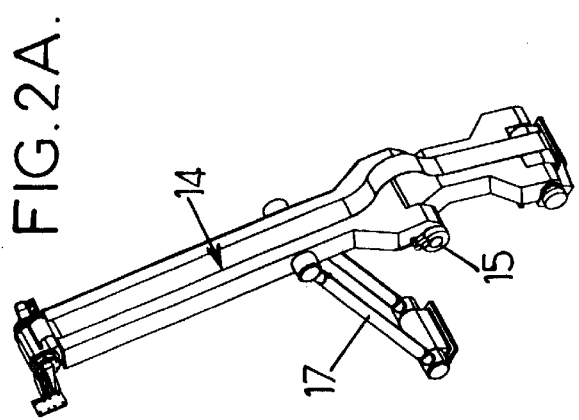

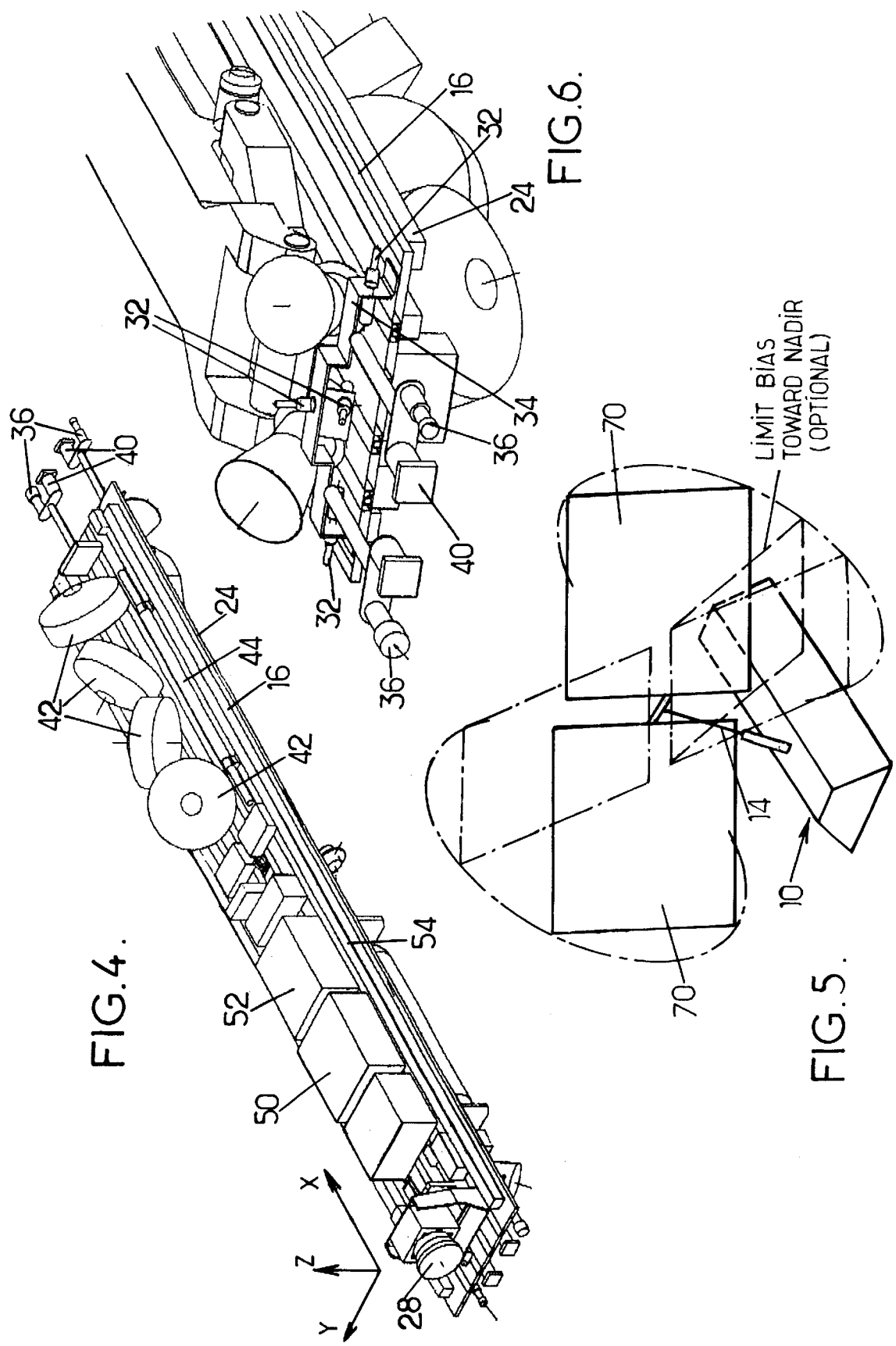

SATELLITE HAVING A SOLAR GENERATOR ON A DEPLOYABLE ARM, AND METHOD OF BRINGING SUCH A SATELLITE ON STATION

BACKGROUND OF THE INVENTION

The present invention relates to satellites for placing in non-equatorial low orbit (LEO) and for carrying a payload which is generally a telecommunications payload. Such a satellite is articularly, but non-exclusively, suitable for use as a telecommunications satellite belonging to a constellation of satellites that are distributed in longitude in such a manner as to be directly in line of sight of one another.

The electrical power required for operating the payload of a satellite, e.g. a telecommunications satellite, is supplied by a solar generator comprising panels whose orientation relative to the platform constituted of the satellite need be modified as the satellite travels round its orbit so as to ensure that the panels present the greatest possible apparent area to sunlight.

For a satellite on a low orbit which is inclined relative to the equator, that means that the solar generator need to be given angular motion about a plurality of axes so as to keep the panels properly oriented and so as to obtain high efficiency. Such motion must not interfere with the field of view of other units of the satellite and in particular its antennas and transducers for links with the ground and for links between the satellites of a constellation that are on orbits that are at the same altitude, but that are mutually offset.

Furthermore, the solar generator must be apt to be taken from a launch configuration in which it has a compact configuration to an operating configuration in which it is spread.

SUMMARY OF THE INVENTION

It is an object of the present invention to provide a satellite whose solar generator is organized and mounted on the platform of the satellite in such a manner as to enable it to perform movements necessary for achieving high energy efficiency, and to do so while avoiding interfering with radio or optical links and/or with detection elements.

To this end, there is provided a satellite having a platform that is elongate in a determined direction (generally designed to constitute its roll axis) and that has a longitudinally-extending face that carries a deployable arm with the solar generator being mounted at the end thereof by means that enable the generator to be rotated through a range of 360° about a first axis which is orthogonal to the direction of elongation of the platform and that enable it to rotate through a limited angular range about a second axis that is orthogonal to the first axis and parallel to the plane of the generator. This limited angular movement can be referred to as "bias".

Typically, the means for rotating the generator are designed to rotate it about the first axis (the pitch axis) at the orbital period. In contrast, the bias movement is seasonal, between two extreme positions corresponding to orbits for local times close to 6:00 AM and 6:00 PM.

The hinged arm is advantageously deployable from a storage condition in which the folded or rolled-up solar generator can contact the side surfaces of the platform, to a deployed state in which it holds the solar cells away from the platform.

Over one orbit or one day, the generator must deliver at least as much electrical energy as is consumed by the satellite. Unfortunately, the amount of power delivered depends both on the surface area of the generator and on the inclination of the generator relative to the solar flux. Ideal bias motion would enable the solar cells to be oriented under all circumstances so as to be orthogonal to the light flux. However various considerations often put a limit on bias.

In a particular embodiment of the invention, where the solar generator comprise two wings disposed symmetrically relative to the arm, it is possible to reduce the consequences of bias limitation for the wing which extends towards the half-space which is on the Earth side of the satellite (towards nadir). For this purpose, the wings are provided with independent bias motors. The motors are controlled symmetrically responsive to time at the orbital period so long as there is no risk that the bias which would be optimum would result in interfering with the fields of view of link or detection elements. Beyond that limit position, the bias motors are controlled:

to give the wing on the side of the half-space away from the Earth motion that ensures optimum orientation therefor at all times, and to limit the amplitude of the motion imparted to the wing on the side of the half-space placed towards the Earth.

Maximum bias therefore may be larger away from the platform than towards the platform, since in the away direction there is no risk of interference with the fields of view of transducers or of antennas.

The cross-section of the platform is advantageously approximately trapezoidal. The platform may have a rigid wall or panel occupying its small base and carrying the most service elements. The arm is advantageously arranged to enable the wings of the solar generator to be maintained in a location and in an orientation such that in a storage configuration they are maintained applied against the side faces of the platform for launch. The length of the arm, and thus the height at which the main axis of rotation (pitch axis) of the wings of the solar generator is located, constitutes a compromise between eliminating interference with the members carried by the platform and accomodating the increased offset of the center of gravity with increasing arm length, and also the increasing difficulties in organizing the storage configuration.

The invention also provides a method of bringing a satellite of the above-defined kind from a transfer orbit to a final low earth orbit,comprising the steps of:

deploying the solar generator while leaving the arm in storage condition, so as to keep down disturbing torque;

orienting a main thruster member so as to take account both of the position of the center of gravity of the satellite while in this condition and of the required direction for upward thrust so as to generate spiral motion that raises the altitude of the orbit;

once the altitude reached is compatible with the capacity for controlling disturbing torques acting on the satellite (generally in the range 550 km and 600 km), deploying the arm; and continuing upward movement by operating the main thruster until the satellite has reached its station, with the satellite always remaining pointed towards the Earth.

During the first portion of upwards movement, while the solar generator is deployed but the arm is not deployed, it is possible to drive the solar cells about the pitch axis and about the orthogonal axis, or to leave them stationary.

The main thruster may be a nozzle capable of taking up two orientations relative to the platform of the satellite in order to take account of the variation in the position of the center of gravity depending on whether the arm is or is not deployed. In both cases, the angular position of the nozzle is selected in optimum manner to take disturbances into account.

The above features and others will appear better on reading the following description of a particular embodiment of the invention, given by way of non-limiting example. The description refers to the accompanying drawings.

BRIEF DESCRIPTION OF THE DRAWINGS

FIG. 1 is a perspective view of a satellite constituting a particular embodiment of the invention, and shown in operational condition;

FIG. 2A is a diagram showing an example of the arm for carrying the solar generator when in deployed condition;

FIG. 2B is a diagram of the arm in a semi-deployed state;

FIG. 3 is a detailed view on a larger scale showing the arm in folded position;

FIG. 4 is a perspective view of the panel wall that occupies the smaller base of the platform, shown upside-down;

FIG. 5 is a sketch showing the symmetrical bias motion that can be given to the two wings of the solar generator;

FIG. 6 is a perspective view showing the elements mounted at the front of the platform.

DETAILED DESCRIPTION

Figure 7:
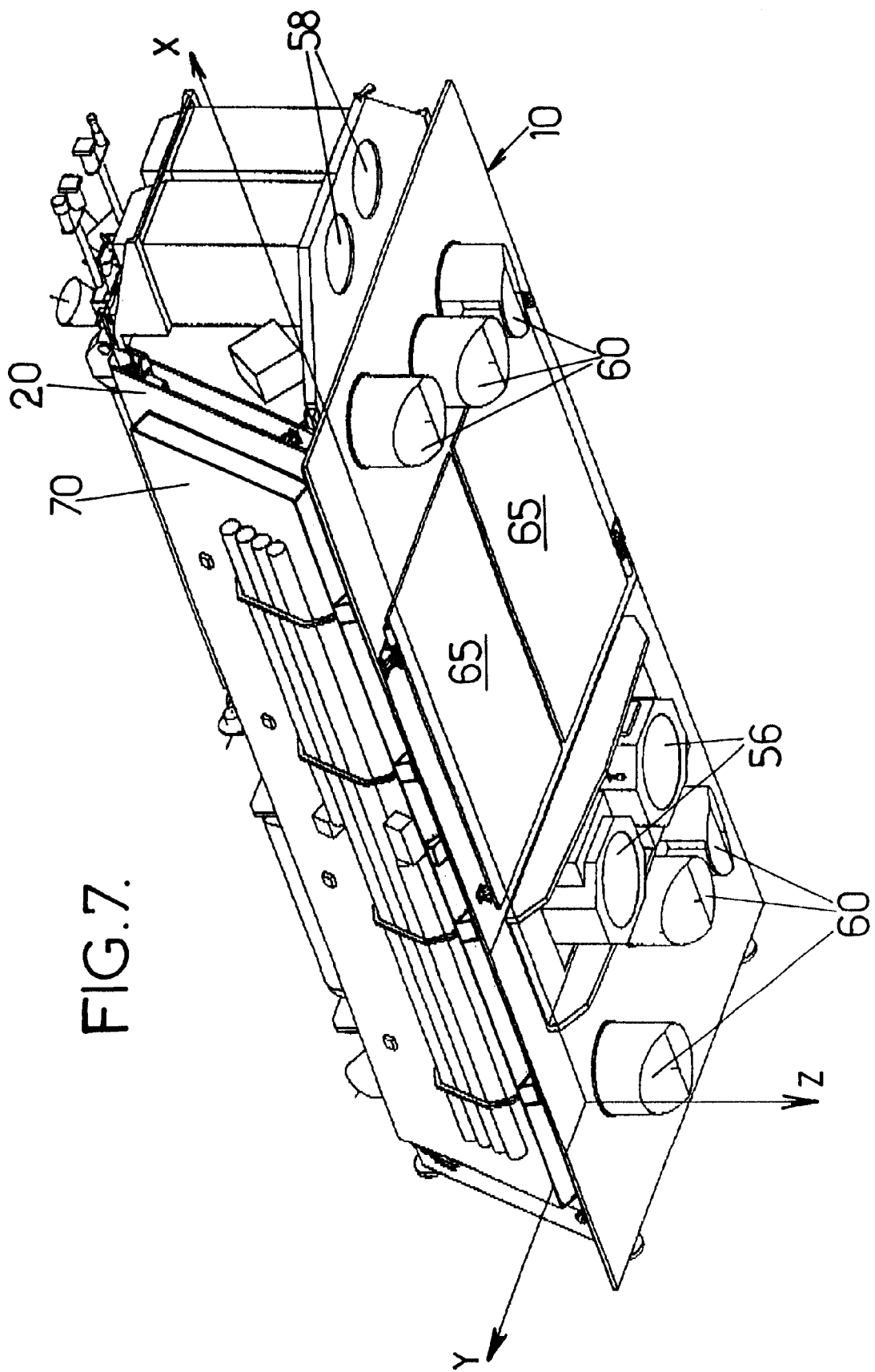
FIG. 7 is a view showing the state of the solar generator and of radiators in condition for launch.

The general structure of the satellite shown in FIGS. 1, 4, 6, and 7 is similar to that described in French patent application No. 9901846, to which reference can be made. The satellite comprises a platform 10 carrying the payload and a solar generator 12 connected to the platform by an arm 14. Referring to FIG. 1, the satellite is shown in the condition it takes up when on station, with arm 14 deployed, whereas FIG. 3 shows the arm in folded condition.

The shape of the platform is elongate in the direction of the roll axis X which is tangential to the path of the satellite, and its cross-section, perpendicular to said direction, is trapezoidal in shape. It can be thought of as constituting a box having a frame and rigid panels or walls fixed to the frame. A rigid panel 16 occupying the smaller base of the trapezoid carries most of the services (satellite propulsion and attitude control members) together with the deployable arm 14. A rigid panel 18 occupying the larger base of the trapezoid is to face Earth (towards nadir), and is thus orthogonal to the yaw axis Z when the satellite is on station. The panel 18 carries practically all of the members that constitute the payload. The panels 20 corresponding to the sides of the trapezoid (FIG. 1) constitute structural elements and carry electronics units on their inside faces. They contribute to removing the heat dissipated on board. Finally, the panels occupying the end faces close the box and can be used for carrying elements for which no room is found on the panel 16.

The strength of the box is provided by four beams 24 (FIG. 4) that are generally made of carbon. The panels are secured on the beams by connecting means (not shown). The beams are interconnected at intervals by partitions.

The outer face of the panel 16 carries the deployable arm 14 and the main thrust member together with its ergol tank or tanks.

The arm 14 can have the structure shown in FIGS. 2A and 3. It comprises a two-part mast hinged at an intermediate point 15 and a connecting rod 17. The connecting rod can be fork-shaped with its two tines disposed on either side of the top portion of the mast when in folded condition (FIG. 3). When deployed by a motor or by pulling tapes, the mast successively takes up the positions shown in FIG. 3, in FIG. 2B, and in FIG. 2A. It can be seen that in the folded position it is against the panel 16 and its width is such that the two wings of the solar generator can be applied against the side walls of the platform.

The thrust member can be a Hall effect ion propulsion nozzle 28 fed with xenon from a pair of tanks 30. It is mounted on a support which may be designed for steering about the X axis. In practice, it is generally sufficient if the nozzle can take up two different angular positions, one directed towards the center of gravity when only the solar cells are deployed, and the other towards the center of gravity when both the solar cells and the arm are deployed.

Two sets of four micronozzles 32 fed with xenon and provided with heating resistors are directed along the roll axis X, the pitch axis Y, and the yaw axis Z so as to be capable of providing thrust in the form of short, weak pulses. These nozzles are carried by the panel 16 via a support bracket 34.

The outer face of the panel 16 also carries star sensors 38 and remote control and telemetry antennas 36 projecting in directions +X and −X. It also carries GPS antennas 40 in the directions +X and -X.

The inner face of the panel 16 carries, in particular, attitude control and avionics components of the satellite. In the embodiment shown in FIG. 4, these members comprise four reaction wheels 42 having different axes, and a torquer 44 operating by interacting with the Earth's magnetic field. The on-board computer 50 and circuits 52 for managing and distributing electrical power can be carried on the inner face. The side zones are reserved for passing electrical connection harnesses 54.

A panel 18 on the larger base of the trapezoidal cross-section carries the payload. On its face facing towards the nadir, it carries at least one antenna 56 for transmitting towards the ground and at least one antenna 58 for receiving from the ground. The transmit antenna is placed between two sets of transducers 60 for providing links with other satellites, generally by optical means. These transducers have a large field of view around the yaw axis Z.

The side panels 20 do not carry sensors or thrusters. As explained below, this makes it possible to provide considerable latitude in orienting the solar cells 12. These sides can carry radiators 62 and 64 which, in the deployed state, extend orthogonally to the direction of the roll axis, or in a direction that is close to being orthogonal thereto.

Two additional radiators 65 (FIGS. 1 and 7) can be mounted so as to be steerable and to make it possible to bring them into an orientation parallel to the elongation direction and to the first axis. These panels, which are thus placed orthogonally to the Z axis, increase heat dissipation capacity.

Each radiator 62 or 64 is mounted on hinge and drive members 66 which serve to move it from a state in which it is flat against the corresponding side panel 20 (FIG. 8) to a state in which it is deployed or spread.

The solar generator 12 is kept away from the satellite platform by the arm, when the arm 14 is deployed. The generator has two wings 70 of equal length. Each wing is connected to the end of the arm 14 via a respective bracket 72 and via actuators.

The actuators comprise a first motor 74 for rotating each wing about an axis parallel to the pitch axis Y so as to keep the generator 12 in an orientation which ensures a maximum apparent area for picking up sunlight. For this purpose, motor 74 is controlled so as to impart panoramic motion to the solar generator at the orbital frequency.

Two other motors 76 (bias motors) are placed each between a respective motor 74 and the corresponding wing of the solar generator, with each of the motors 76 being designed to rotate a respective one of the solar wings through a limited angular range about an axis orthogonal to the axis of panoramic motion and parallel to the plane of the wing, thereby serving to accommodate seasonal variations in the orientation of the Earth relative to the Sun.

By using an arm 14 of sufficient length, it is possible to give the wings optimum bias in all orientations of the satellite relative to the Sun, and without interfering with the fields of view of the elements carried by the panel 20. However it is frequently desirable to limit the length of the arm as far as possible. Under such conditions, it is no longer possible to give optimum bias to that one of the wings which extends towards the nadir when the wings have certain pitch angles. By using two independent motors 76, it is possible to keep the wing 70 that projects towards the zenith at its optimum value, while limiting the extent to which the other wing 70 dips Earthwards to a value such that there is no interference.

It is also necessary for the solar generator to be capable of being moved from a launch configuration where it is stowed compactly to a service configuration in which it is deployed.

Because the elements for providing links with the ground and between satellites are placed solely on the panel which faces the nadir, the solar generator is not prone to enter the fields of view of those elements unless excessive bias is applied thereto: in practice, a bias of about 20° about a middle position is easily accommodated without interfering with the detection and propulsion units that are placed solely at the ends of that panel that faces the zenith.

The bias movements imparted to the wings can therefore be symmetrical so long as there is no risk of interference for the solar generator wing whose bias brings it closer to the platform. However, it may be necessary to limit the bias of the wing that comes closer to the platform while nevertheless maintaining power balance by means of the other wing. For example, the latter wing may alternate through ±20° about a mean bias angle of 27°, which is equivalent to a fixed bias excursion of 20° as is required from the energy balance point of view but is not usable because of interference with the fields of view of the payload.

When the wings are folded or rolled-up and the brackets 72 are folded onto the wings, both wings of the solar generator 12 can be stored against the side panels of the platform.

The solar generator in this configuration does not interfere in any way with the operation of the various elements mounted on the panels 16 or 18, or on the end panels.

The solar generator is designed to be deployable even when the arm itself is in folded condition. In this situation, the solar generator unbalances the satellite much less than it does when the arm is deployed. It can nevertheless supply the electrical power required for operating stages having power requirements that are lower than when the satellite is fully operational. The dimensions of the brackets 72 are such that they are large enough to enable the wings to rotate without interfering with the platform.

In this situation, it is possible to use the nozzle 28, which is optionally steerable, to cause the satellite to be brought from a low altitude transfer orbit to a final orbit while minimizing disturbances due to atmospheric drag which is kept down by deploying the solar cells while keeping the arm 14 in the storage position.

Given the low thrust imparted by the nozzle 28, the time required to rise to the final orbit can be long, during which time it is necessary to monitor and to control attitude continuously; this isdone by means of elements which are not impeded by the solar generator.

In normal operation, when the satellite is on station, altitude and attitude can be controlled in relatively conventional manner. During normal mode station keeping, the computer receives information coming from the star sensors 38 and from the information picked up by the GPS antennas 40. Attitude can be corrected by acting on the reaction wheels 42 and on the magnetic torquers 44. Changes of speed can be provided by operating the Hall effect nozzle 28 and the micronozzles 32 which can be used equally well for acceleration and for deceleration.

Finally, when rising to final orbit and when being displaced to a graveyard orbit, the necessary thrust is produced by the nozzle 28 and proper attitude is maintained by means of the magnetic torque generators 44 and the reaction wheels 42.

By way of example, a possible sequence for bringing the satellite from a transfer orbit into which it is delivered by a launcher to a final orbit will now be deescribed.

The solar generator is deployed while keeping the arm in the stored position so as to keep down disturbing torques. The orientation of the satellite is corrected and any spin motion thereof is corrected by means of the micronozzles. The Hall effect nozzle is used once the satellite is optimally oriented relative to the position of its center of gravity so as to cause the altitude of the orbit to rise. Once the satellite has reached an altitude of 550 km to 600 km, where drag and thus disturbing torques are lower, the arm is deployed. The increase in altitude is followed by a thrust until the satellite comes spirally on station, with the satellite continuing to be kept pointing towards the Earth by controls whose input signals originate essentially from the star sensors.

The solar generator is associated with storage batteries, and it is desirable for their capacity to be as small as possible. To achieve this result, the solar spirally is designed so that the total energy delivered over one orbit or over one day (payload utilization profile over a 24-hour period) is always at least as great as the amount of energy consumed by the satellite.

Depending on the time of year, the satellite may or may not pass into the Earth's shadow. The way the solar generator is mounted presents the following advantages:

- the wings can be aimed in optimal manner when the satellite is in a noon-midnight orbit, for which the crosings of the shadow of the Earth are longest; and
- when the satellite is on a 6:00 AM–6:00 PM orbit the inability for the wing that is pointing towards the platform to reach optimum pointing is compensated, at least in part, by the fact that the satellite is then never in shadow; furthermore, the limitation due to the need to avoid interfering with the fields of view of the sensors or with the jets of the nozzles applies only to the wing which extend towards the platform. Because the motors for the two wings are independent, the wing extending away from the platform can be biased over a larger angular range, and this can be done both at orbital period and at seasonal period simultaneously.

What is claimed is:

1. Satellite having:

a platform of elongated shape in a determined direction, a deployable arm carried by a longitudinally extending face of said platform, a solar generator carried at the end of said arm and comprising two wings disposed symmetrically relative to the arm, first means for rotating the generator through a range of 360° about a first axis which is orthogonal to the direction of elongation of the platform, comprising a common motor for rotating both wings simultaneously, and second means for rotating the generator through a limited angular range about a second axis that is orthogonal to the first axis and parallel to a flat surface of the generator, comprising two mutually independent bias motors each actuating one of said wings.

2. Satellite according to claim 1, wherein said arm is deployable from a storage condition in which the solar generator in folded or rolled-up condition contacts side surfaces of the platform to a deployed state in which it holds the solar cells away from the platform.

3. Satellite according to claim 1, wherein the second means consist of two mutually independent bias motors each actuating one of said wings and each located between a respective one of said wings and said common motor which is located between said bias motors and said arm.

4. Satellite according to claim 3, wherein the bias motors are controlled symmetrically responsive to time at the orbital period unless the bias of one of the wings exceeds a predetermined limit beyond which there would be interference of one of said wings with fields of view of elements carried by the platform.

5. Satellite according to claim 4, wherein, beyond said predetermined limit, the bias motors are controlled:

to give that of the wings which is located in a half-space away from the Earth a motion that ensures optimum orientation thereof, and to limit the amount of motion imparted to the other of said wings.

6. Satellite according to claim 1, wherein said second means are controlled responsive to time at the orbital period up to a limit position beyond which a bias which would be optimum would result in interfering with fields of view of elements carried by the platform.

7. Satellite according to claim 1, wherein the first means are controlled for rotating the generator continuously about the first axis at an orbital period equal to a period of an Earth orbit of the satellite and the second means are controlled to provide an alternating bias movement responsive to Earth seasons.

8. Satellite according to claim 1, wherein the platform has a substantially trapezoidal cross-section and has a rigid wall or panel occupying a smaller base of said cross-section and carrying most service elements of the satellite.

9. Satellite according to claim 1, further comprising a Hall effect ion propulsion nozzle mounted on a steering support for adjusting an angular position of the nozzle about an axis on the platform.

10. Satellite according to claim 8, further comprising radiators pivotally connected to side walls of the platform and movable between a deployed state where they extend orthogonally to a roll axis of the satellite and a stored condition in contact with the side walls.

11. A satellite having:

a platform of elongated shape in a direction parallel to a roll axis of the satellite, a deployable arm pivotally carried by a longitudinally extending face of said platform, a solar generator carried at the end of said arm, first means for aiming the generator through a range of 360° with respect to said end of said arm about a first axis constituting a pitch axis orthogonal to the direction of elongation of the platform, and second means for rotating the solar generator through a limited angular range about a second axis that is orthogonal to the first axis and parallel to a flat surface of the solar generator, said arm being arranged for moving the solar generator away from a stored position in contact with the platform in a direction of a yaw axis.

12. A method of bringing a satellite from a transfer orbit to a final low Earth orbit, said satellite having a platform of elongated shape in a determined direction parallel to a roll axis of the satellite, a deployable arm carried by a longitudinally extending face of said platform, a solar generator carried at the end of said arm by first means for rotating the generator through a range of 360° about a first axis constituting a pitch axis which is orthogonal to the direction of elongation of the platform and second means for rotating the generator through a limited angular range about a second axis that is orthogonal to the first axis and parallel to the plane of the generator, said method comprising the steps of:

deploying the solar generator while leaving the arm in storage condition, so as to keep down disturbing torque;

orienting a main thruster member so as to take account both of the position of the center of gravity of the satellite while in this condition and of the required direction for upward thrust so as to generate spiral motion that raises the altitude of the orbit;

once an altitude is reached which is compatible with a capacity for controlling disturbing torques acting on the satellite deploying the arm; and continuing upward movement by operating a main thruster until the satellite has reached its station, with the satellite always remaining pointed towards the Earth during said upward movement.

* * * * *